US010009225B2

(12) United States Patent
Mares et al.

(10) Patent No.: US 10,009,225 B2
(45) Date of Patent: Jun. 26, 2018

(54) SYSTEM AND METHOD FOR SUPPORTING MULTIPLE PARTITION EDIT SESSIONS IN A MULTITENANT APPLICATION SERVER ENVIRONMENT

(71) Applicant: ORACLE INTERNATIONAL CORPORATION, Redwood Shores, CA (US)

(72) Inventors: Martin Mares, Prague (CZ); Peter Bower, Hollis, NH (US); Petr Janouch, Prague (CZ); Marek Potociar, Prague (CZ); Pavel Bucek, Prague (CZ); Michal Gajdos, Prague (CZ)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 239 days.

(21) Appl. No.: 14/747,675

(22) Filed: Jun. 23, 2015

(65) Prior Publication Data

US 2016/0020949 A1     Jan. 21, 2016

Related U.S. Application Data

(60) Provisional application No. 62/016,040, filed on Jun. 23, 2014, provisional application No. 62/054,908, filed on Sep. 24, 2014.

(51) Int. Cl.
*G06F 15/16* (2006.01)
*G06F 15/173* (2006.01)
(Continued)

(52) U.S. Cl.
CPC ....... *H04L 41/0813* (2013.01); *G06Q 10/101* (2013.01)

(58) Field of Classification Search
CPC . H04L 41/0813; H04L 47/70; H04L 41/0806; H04L 41/0816; H04L 63/0272;
(Continued)

(56) References Cited

U.S. PATENT DOCUMENTS 7,765,187 B2 * 7/2010 Bergant .............. G06F 11/1435
                                                            707/614
8,560,699 B1 * 10/2013 Theimer .............. G06F 9/44505
                                                            705/26.1
(Continued)

OTHER PUBLICATIONS

CISCO, "Designing Secure Multi-Tenancy into Virtualized Data Centers," Dec. 2009, CISCO, www.cisco.com/c/en/us/td/docs/solutions/Enterprise/Data_Center/Virtualization/securecldg.html.*
(Continued)

*Primary Examiner* — Ruolei Zong
(74) *Attorney, Agent, or Firm* — Tucker Ellis LLP

(57) ABSTRACT

In accordance with an embodiment, described herein is a system and method for supporting multiple partitions and edit sessions in a multitenant application server environment. In accordance with an embodiment, a first administrator or user can obtain a named edit session for use with a partition, make changes, and then activate those changes. Another administrator or user can create a named edit session in parallel. If there are conflicts between a concurrent change and changes being made by another user, the administrator will receive an error when activating the changes. At that point, the administrator can resolve the conflicts and activate the changes. Upon activation, the changes in the edit session will be applied to a global edit configuration.

20 Claims, 10 Drawing Sheets

(51) Int. Cl.
 *H04L 12/24* (2006.01)
 *G06Q 10/10* (2012.01)
(58) Field of Classification Search
 CPC . H04L 41/0803; G06F 9/45558; G06Q 10/00; G06Q 10/101
 USPC .......................................................... 709/221
 See application file for complete search history.

(56) References Cited

U.S. PATENT DOCUMENTS

| | | | | |
|---|---|---|---|---|
| 8,813,225 | B1 * | 8/2014 | Fuller | H04L 63/10 726/23 |
| 2009/0271696 | A1 | 10/2009 | Bailor | |
| 2011/0213870 | A1 | 9/2011 | Cai | |
| 2012/0072597 | A1 | 3/2012 | Teather | |
| 2012/0110566 | A1 | 5/2012 | Park | |
| 2013/0036400 | A1 | 2/2013 | Bak | |
| 2013/0268920 | A1 | 10/2013 | Ursal | |
| 2013/0339400 | A1 * | 12/2013 | Pflughoeft | G06F 17/30289 707/803 |
| 2014/0082470 | A1 * | 3/2014 | Trebas | G06F 17/2229 715/217 |
| 2014/0149361 | A1 * | 5/2014 | Hosey | G06F 8/71 707/690 |
| 2014/0280306 | A1 * | 9/2014 | Juillard | H04L 67/34 707/769 |

OTHER PUBLICATIONS

International Searching Authority at the European Patent Office, International Search Report and Written Opinion for PCT International Patent Application PCT/US2015/037265, dated Sep. 24, 2015, 10 pages.

International Searching Authority at the European Patent Office, International Search Report and Written Opinion for PCT International Application No. PCT/US2015/012268, dated Apr. 24, 2015, 10 pages.

* cited by examiner

SYSTEM AND METHOD FOR SUPPORTING MULTIPLE PARTITION EDIT SESSIONS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR SUPPORTING MULTIPLE PARTITION EDIT SESSIONS IN A MULTITENANT APPLICATION SERVER ENVIRONMENT", Application No. 62/016,040, filed Jun. 23, 2014; U.S. Provisional Application titled "SYSTEM AND METHOD FOR SUPPORTING MULTIPLE PARTITION EDIT SESSIONS IN A MULTITENANT APPLICATION SERVER ENVIRONMENT", Application No. 62/054,908, filed Sep. 24, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting multiple partitions and edit sessions in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for supporting edit sessions in a multi-tenant application server environment. In accordance with an embodiment, a first administrator or user can obtain a named edit session for use with a partition, make changes, and activate those changes. Another administrator or user can create a named edit session in parallel. If there are conflicts between a concurrent change and changes being made by another user, the administrator can receive an error when activating the changes. At that point, the administrator can resolve the conflicts and activate the changes. Upon activation, the changes in the edit session will be applied to a global edit configuration.

DETAILED DESCRIPTION

In accordance with an embodiment, described herein is a system and method for supporting edit sessions in a multi-tenant application server environment. In accordance with an embodiment, a first administrator or user can obtain a named edit session for use with a partition, make changes, and then activate those changes. Another administrator or user can create a named edit session in parallel. If there are conflicts between a concurrent change and changes being made by another user, the administrator will receive an error when activating the changes. At that point, the administrator can resolve the conflicts and activate the changes. Upon activation, the changes in the edit session will be applied to a global edit configuration.

Application Server (e.g., Multi-Tenant, MT) Environment

Figure 1:
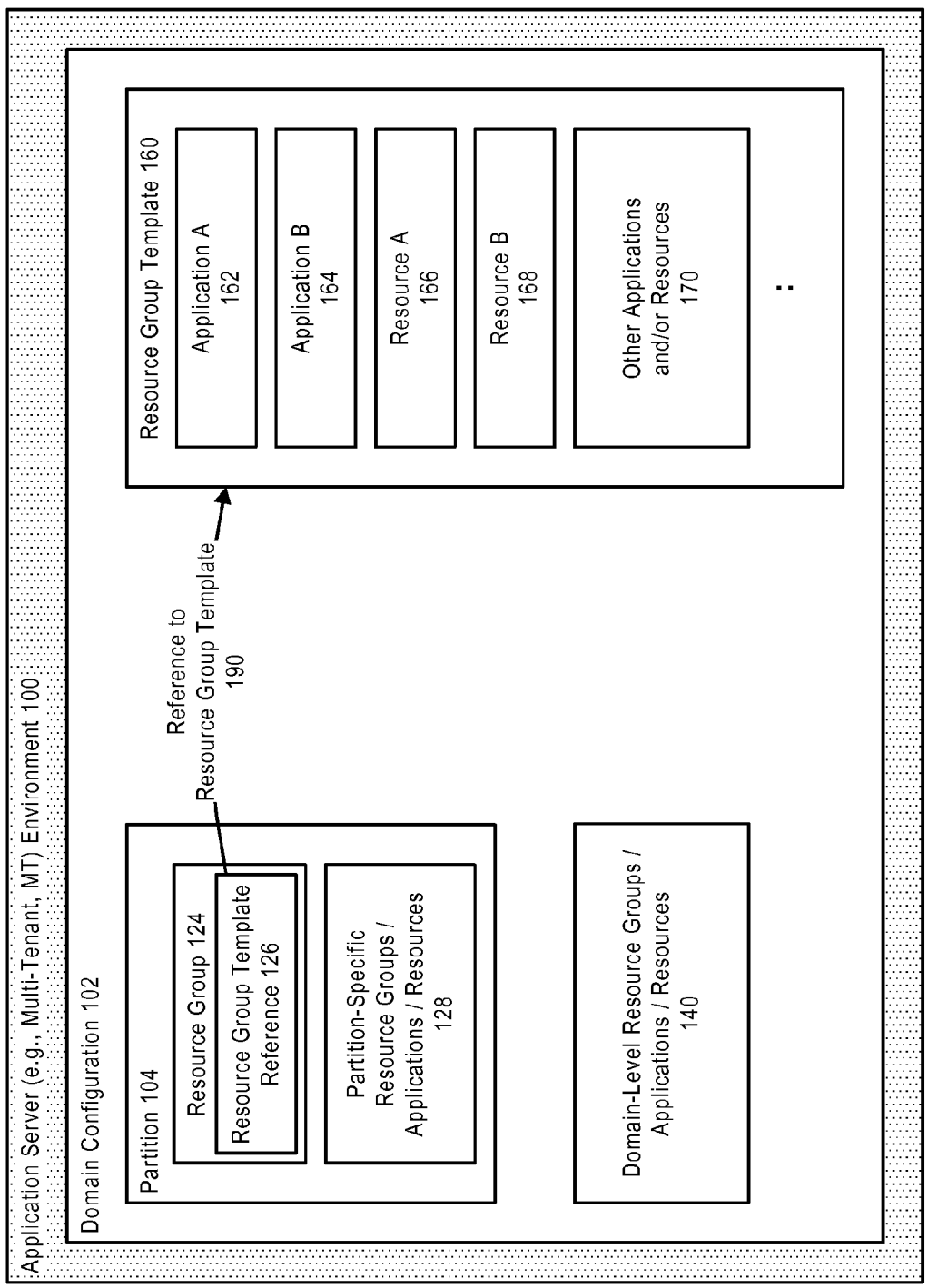
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
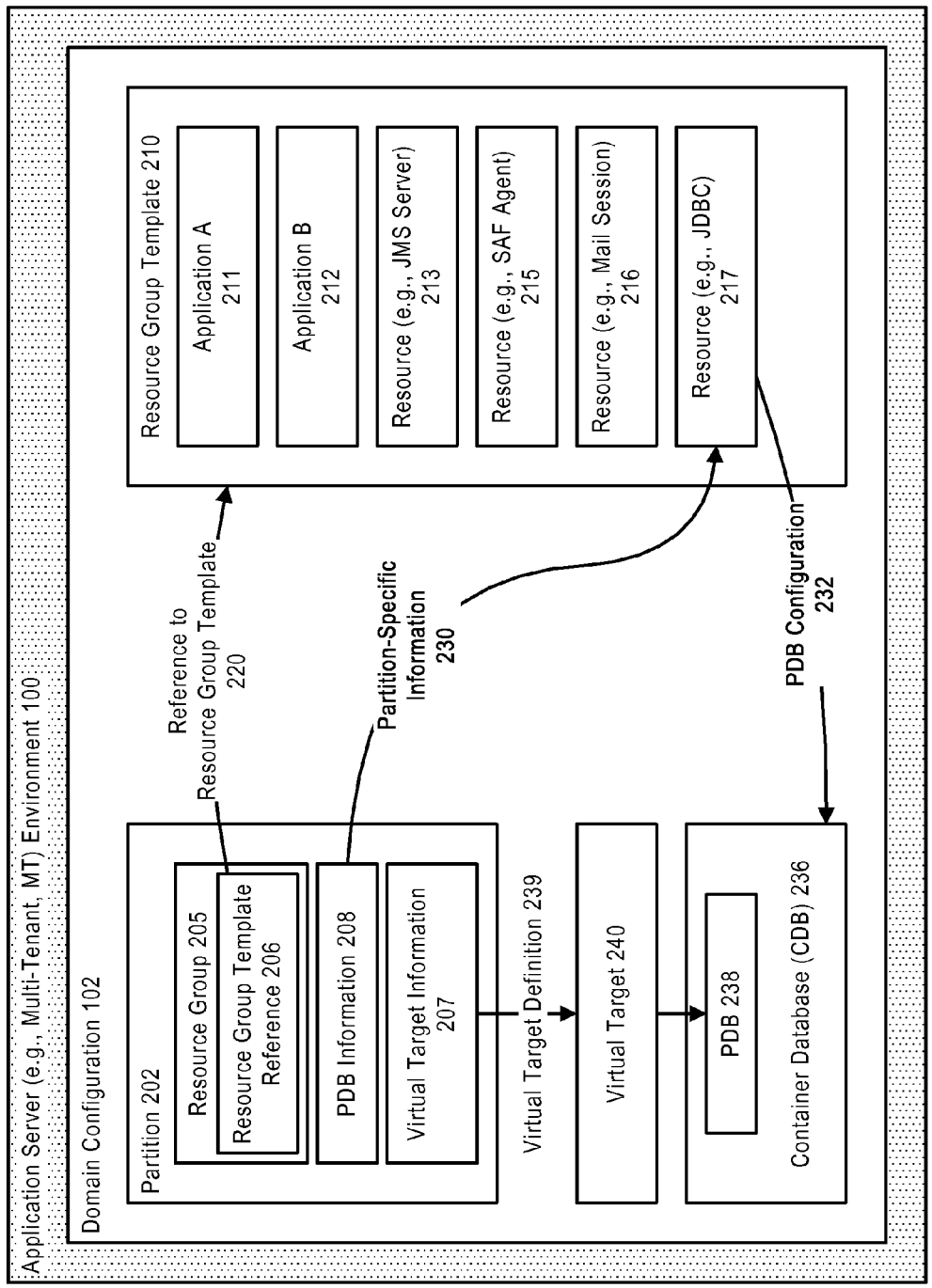
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
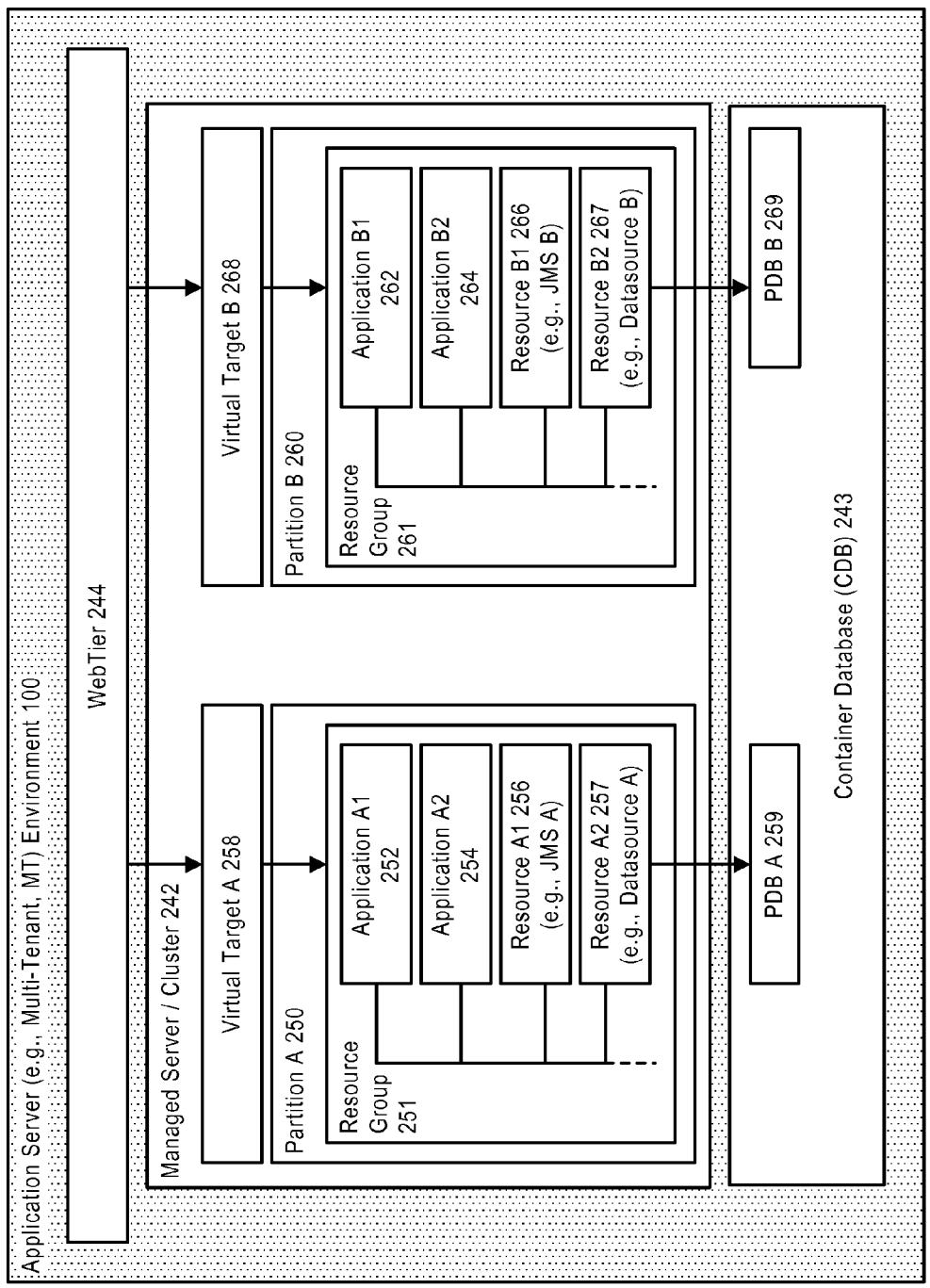
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
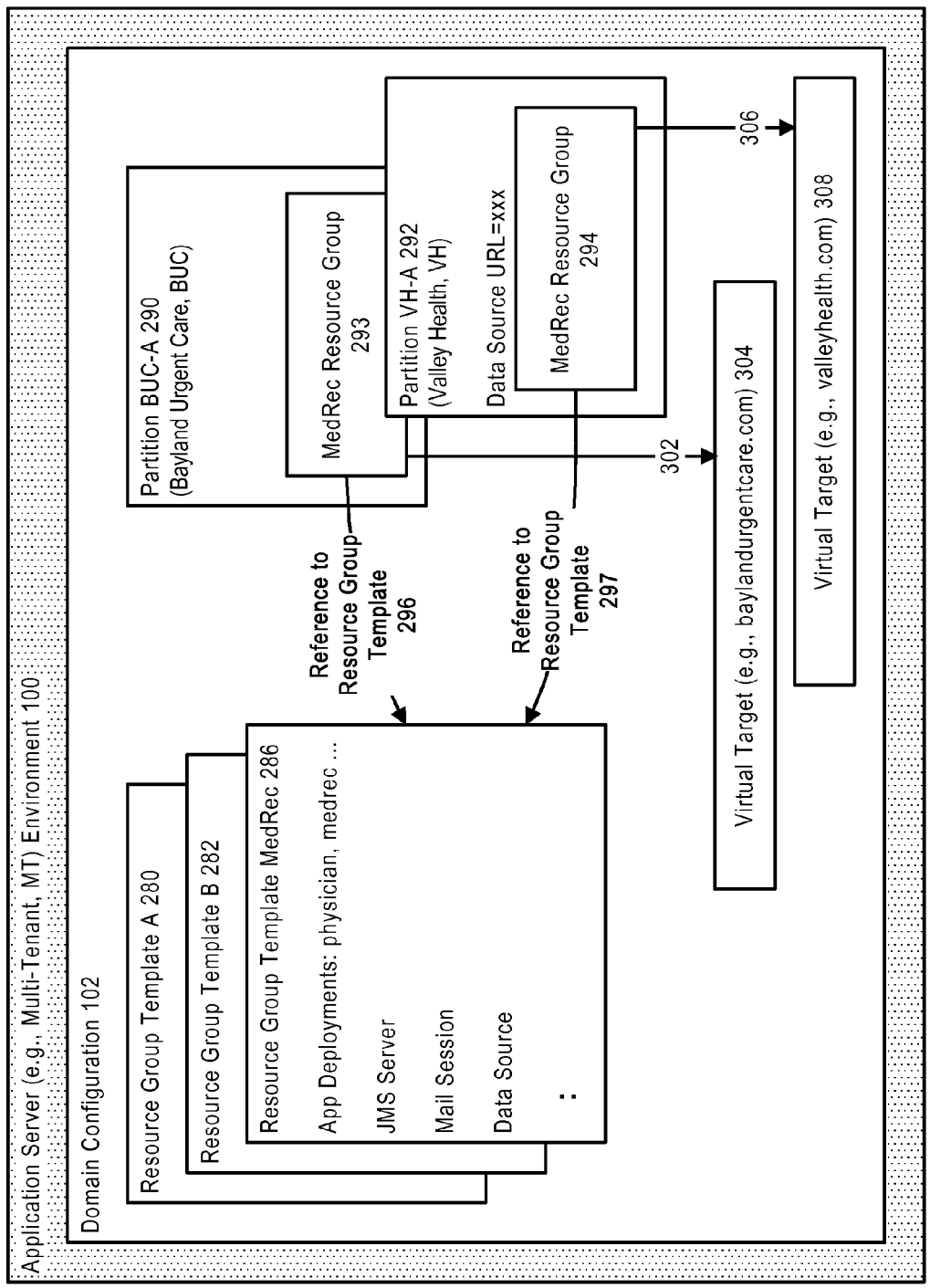
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
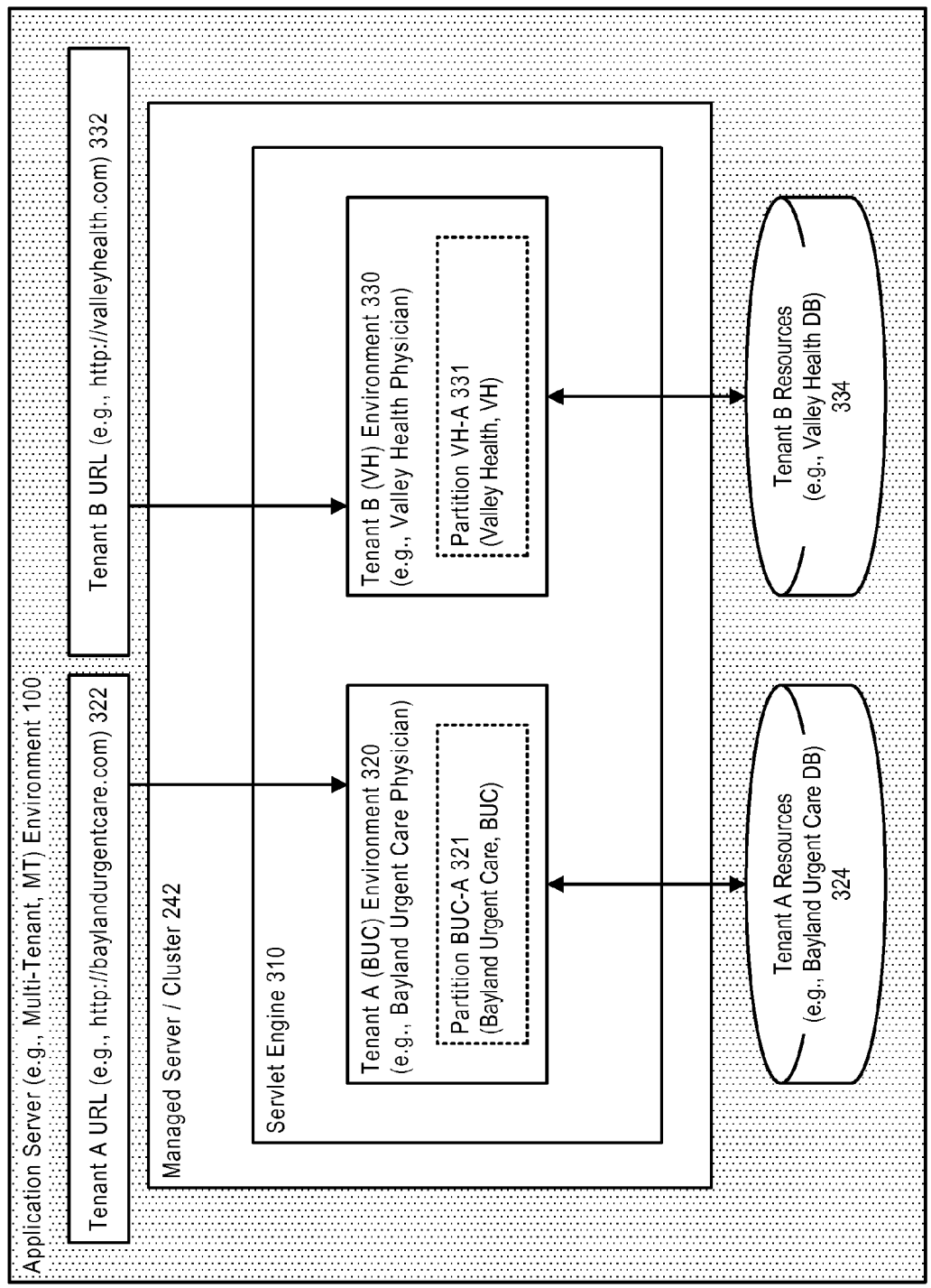
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Support for Multiple Edit Sessions

In an application server environment, for example a multitenant application server environment, an application server domain can have multiple partitions and multiple configuration files, and are managed by different types of administrators. A single edit session of configuration files is insufficient for such a domain.

In accordance with an embodiment, described herein is a system and method for supporting edit sessions in a multi-tenant application server environment. In accordance with an embodiment, a first administrator or user can obtain a named edit session for use with a partition, make changes, and then activate those changes. Another administrator or user can create a named edit session in parallel. If there are conflicts between a concurrent change and changes being made by another user, an administrator can receive an error alert when activating the changes. At that point, an administrator can resolve the conflicts and activate the changes. Upon activation, the changes in an edit session will be applied to a global edit configuration.

In accordance with an embodiment, this feature can be used in a multitenant or non-multitenant environment. In a multitenant environment, the feature can be started automatically, while in a non-multitenant environment, the feature can be manually started.

In accordance with an embodiment, an administrator, for example a system administrator or a partition administrator, can start a named edit session, and take a snapshot of a configuration of the domain, wherein the domain configuration includes one or more partition configurations. The administrator can change the parts of the domain configuration that the administrator is authorized to change, and active the changes. The system can subsequently check for any conflicts between the changes and one or more already activated changes.

In accordance with an embodiment, conflicts can occur between concurrent or parallel named edit sessions when changes made by a named edit session are activated. For example, after a first named edit session is started, the current domain configuration can have been changed by a second named edit session. When the changes made to a snapshot of the domain configuration in the first named edit session are activated to be applied to the domain configuration, potential conflicts may occur. One example of potential conflicts is that the first named edit session has updated a configuration bean that has been deleted by the second edit session from the domain configuration.

In accordance with an embodiment, the conflicts can occur between changes made by two or more partition administrators to a same partition, between changes made by two or more system administrators that have modified the global properties of the domain configuration, or between changes made by a system administrator and a partition administrator.

When changes from one named edit session are activated, the system can detect conflicts. If the conflicts can be resolved in accordance with a set of configurable rules, the changes are activated and applied to the current domain configuration. If the conflicts cannot be resolved based on the rules, the activation operation fails, and the conflicts are displayed on a user interface for manual resolution by the administrator.

Alternatively, the administrator can invoke a resolve method via a management application programming interface, wherein the resolve method can be used to apply any concurrently applied configuration changes to the current named edit session.

After the manual resolution or the resolution by the resolve method, the changes in the current named edit session can be activated again.

Figure 6:
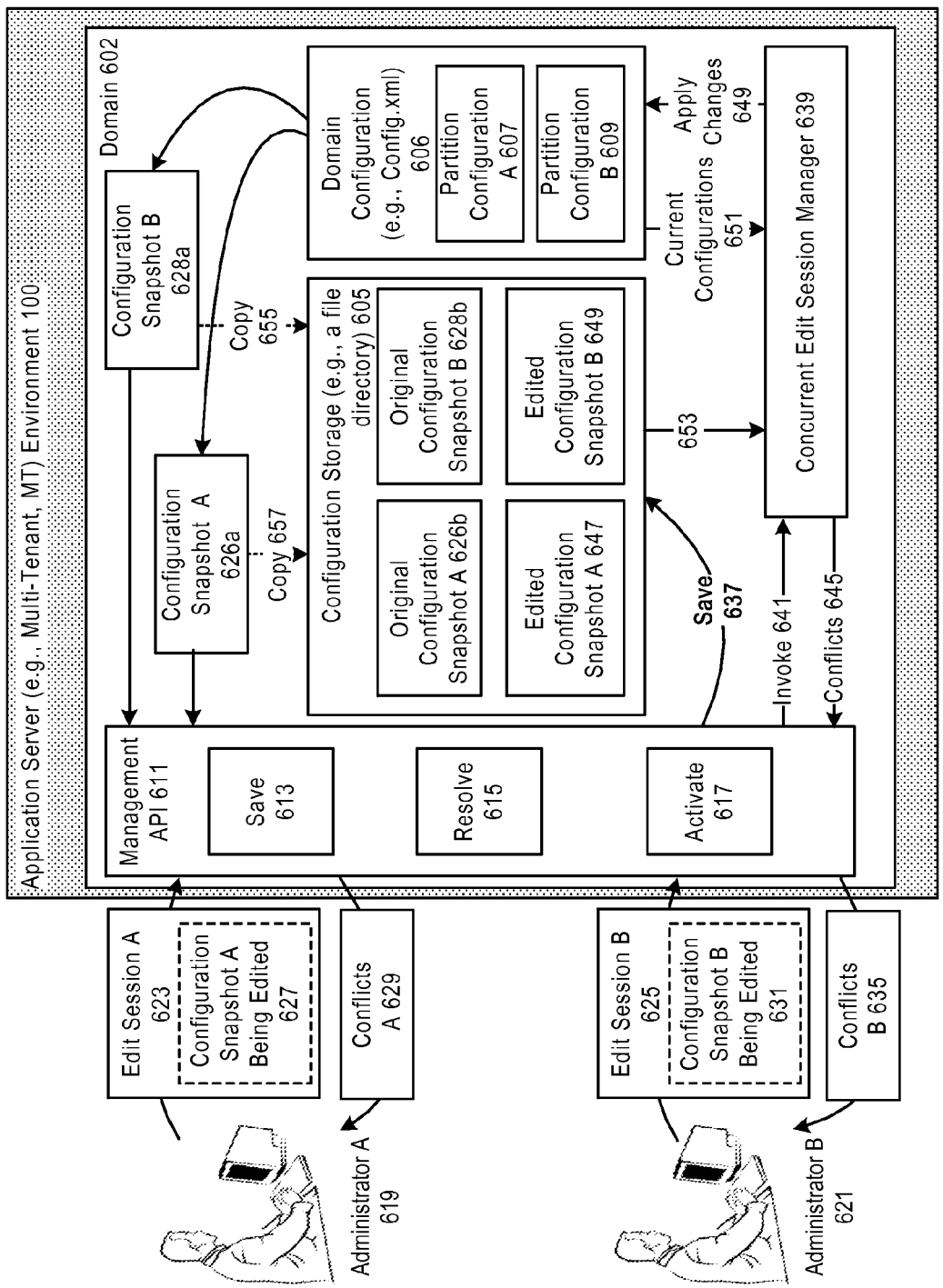
FIG. 6 illustrates a system for supporting multiple edit sessions in an application server, cloud or other environment, in accordance with an embodiment.

FIG. 6 illustrates a system for supporting multiple edit sessions in an application server, cloud or other environment, in accordance with an embodiment.

As shown in FIG. 6, the system includes a domain 602 in the application server environment 100. A domain configuration 606 can include a plurality of configurations for partitions (for example, partition configuration A 607 and partition configuration B 609). Each partition configuration can define a partition, and can be edited by an administrator for the partition.

In accordance with an embodiment, a system administrator or a partition administrator can edit the domain configuration by working on a snapshot of the configuration (for example, configuration snapshot A 626a or configuration snapshot B 628a). The configuration snapshot can be represented by a separate hierarchy of configuration MBeans that resides on an administration server.

In accordance with an embodiment, the domain configuration can be edited by multiple administrators (for example, administrator A 619 and administrator B 621 using multiple concurrent sessions (for example, edit session A 623 and edit session B 625). Each edit session can be uniquely identified with a name that is specified at the session start time, and can have its own configuration files and its own configuration management bean instance.

As shown in FIG. 6, the administrator A can edit the configuration snapshot A 627 in the edit session A, and the administrator B can edit configuration snapshot B 631 in the edit session B.

In accordance with an embodiment, an administrator can use a management API 611 (for example, a runtime Mbean API) to create or destroy named concurrent edit sessions. The management API can include a plurality of interfaces (for example, save 613, resolve 615, and activate 617) that enable the administrator to perform a plurality of operations, for example starting an edit session, persisting changes, displaying changes, and undoing changes.

In accordance with an embodiment, changes made in the edit session can be saved 637 to a storage 605 in the domain. The saved changes do not take effect until they are activated. Activating changes can include merging the changes into the domain configuration and distributing the changes to all server instances in the domain.

As described above, each edit session is working off a snapshot of the domain configuration. Conflicts between changes made in each edit session can occur. For example, one edit session updates a configuration bean that has been deleted from the domain configuration by another edit session, or one edit session changes an attribute that has also been changed by another edit session. The conflicts can occur between changes made by a plurality of partition administrator for a same partition, between changes made by a plurality of system administrators, or between changes made by a system administrator and a partition administrator.

In accordance with an embodiment, when an administrator activates configuration changes in an edit session, a concurrent edit session manager 639 can be invoked 641, to detect conflicts between the changes to be activated and changes that were activated after the edit session started. The concurrent session manager can receive 653 changes made by an edit session (for example, edited configuration snapshot A 647 or edited configuration snapshot B 649) and an original snapshot (for example, original configuration snapshot A 626b or original configuration snapshot B 628b). Similarly, the concurrent edit session manager can receive 651 the current domain configuration (i.e. domain configuration 605), or a portion thereof. Using the received information, the concurrent edit session manager can determine conflicts in accordance with a set of rules, and resolve a portion, or all of the conflicts based on a set of rules.

As shown in FIG. 6, when no conflicts are detected, or detected conflicts are resolved successfully, the changes made by an administrator can be applied 649 to the domain configuration. If the detected conflicts cannot be resolved, the conflicts 645 can be displayed, 629 or 635, to the administrator for manual resolution.

Figure 7:
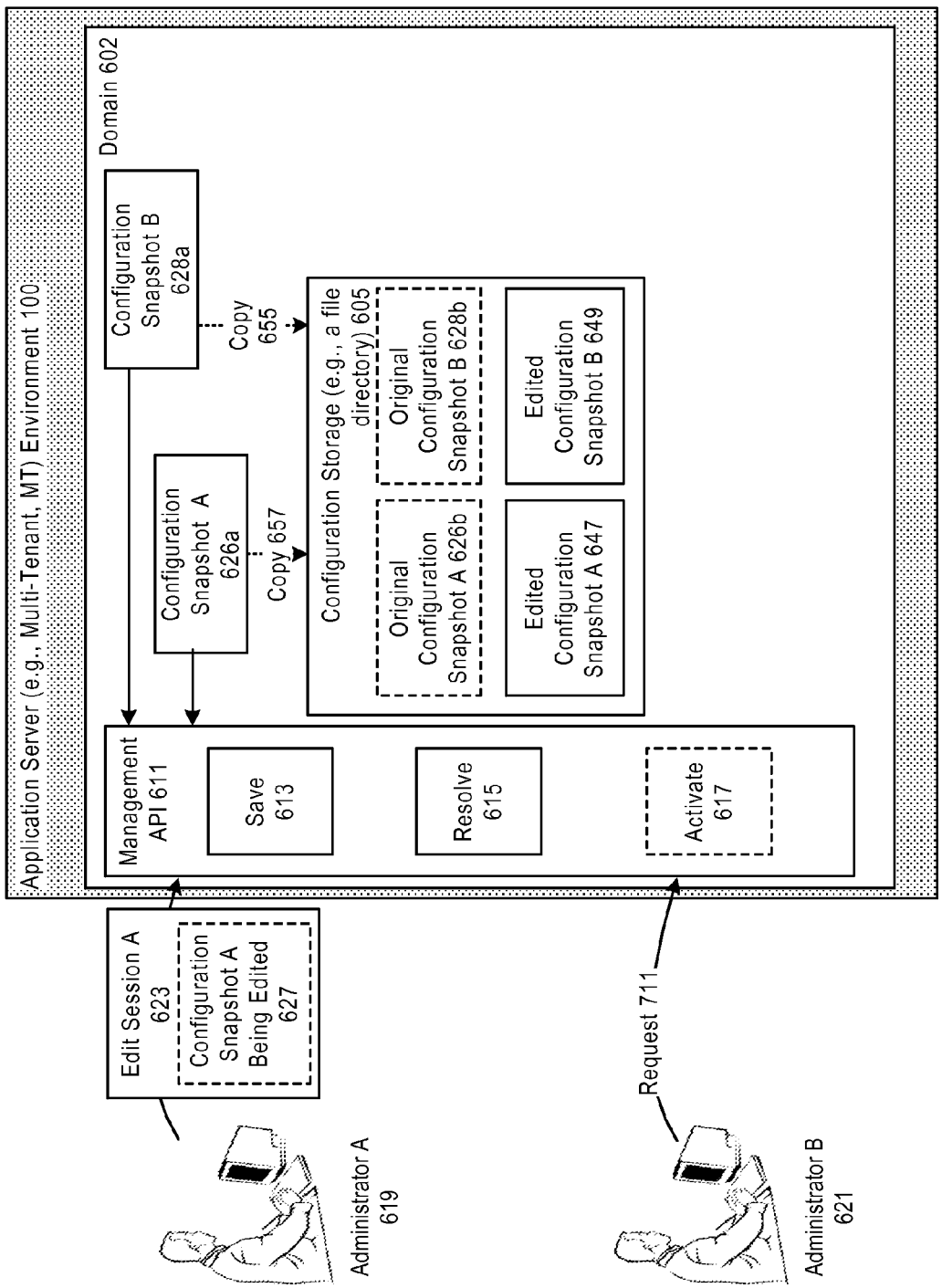
FIG. 7 further illustrates a system for supporting multiple edit sessions in an application server, cloud or other environment, in accordance with an embodiment.

FIG. 7 further illustrates a system for supporting multiple edit sessions in an application server, cloud or other environment, in accordance with an embodiment.

In accordance with an embodiment, a configuration snapshot can represent the original version of configuration files, or a configuration from which an edit session or edit tree was started.

As described above, the configuration snapshots need to be persisted or copied, 655 or 657, to the configuration storage for use in determining conflicts between changes made by concurrent edit sessions.

In accordance with an embodiment, a configuration snapshot associated with a concurrent edit session can be persisted to the configuration storage when the concurrent edit session, or another concurrent edit session, performs an activate operation. If no activate operation is detected, the configuration snapshots is not to be copied to the configuration storage, to reduce the number of configuration files that need to be copied.

In accordance with an embodiment, the management API can be configured to copy all configuration snapshots, or only a configuration snapshot that is needed for conflicts determination. Alternatively, the management API can be configured to copy only those files in a configuration snapshot that are needed for conflict determination.

As an illustrative example, the administrator B requests 711 an activate action, while the administrator A is working in a concurrent edit session. As a result of the request, the management API can copy the configuration snapshots A and B, or one of them, or one or more files in either configuration snapshot to the configuration storage.

Conflicts Determination

Figure 8:
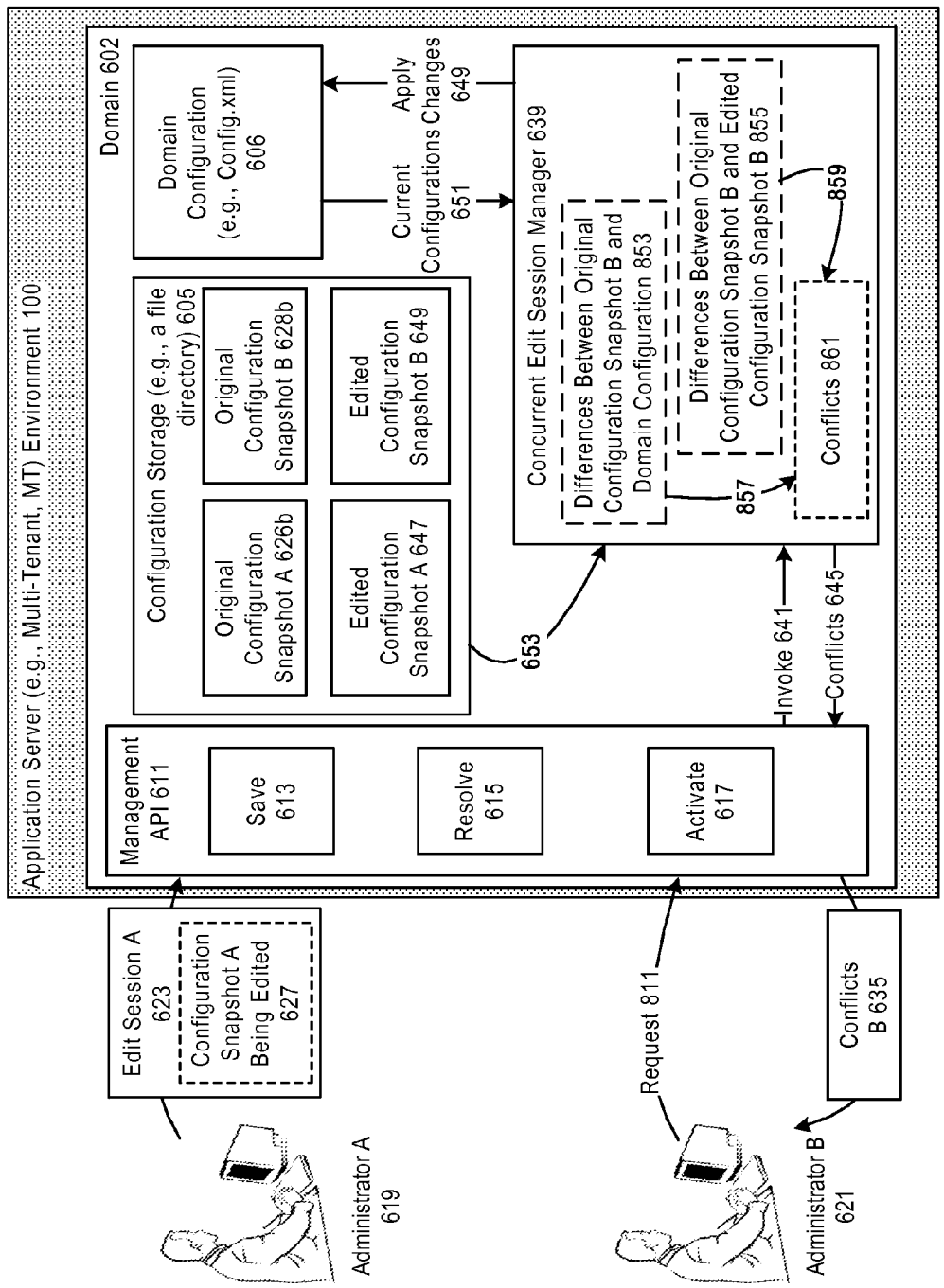
FIG. 8 further illustrates a system for supporting multiple edit sessions in an application server, cloud or other environment, in accordance with an embodiment.

FIG. 8 further illustrates a system for supporting multiple edit sessions in an application server, cloud or other environment, in accordance with an embodiment.

In accordance with an embodiment, conflicts between changes made by concurrent edit sessions are determined when an edit session performs an activate action.

For example, administrator B working in an edit session can request 811 an activate action, and invoke the concurrent session manager to determine potential conflicts in accordance with a set of rules.

In accordance with an embodiment, conflicts can be found and optionally resolved using a rules-based approach. For example, if no changes have been made to the domain configuration (for example, a WebLogic runtime domain configuration) since the edit session was started, the edit session changes can be activated. If changes have been made to the domain configuration, the concurrent edit session manager can determine differences 853 between an original configuration snapshot that the edit session works off and the domain configuration. The concurrent edit session manager can also determine differences 855 between the edited configuration snapshot that including changes made in the edit session and the original snapshot configuration that edit session works off. The two sets of differences determined above can be compared to identify, 857 or 859, potential conflicts 861.

Figure 9:
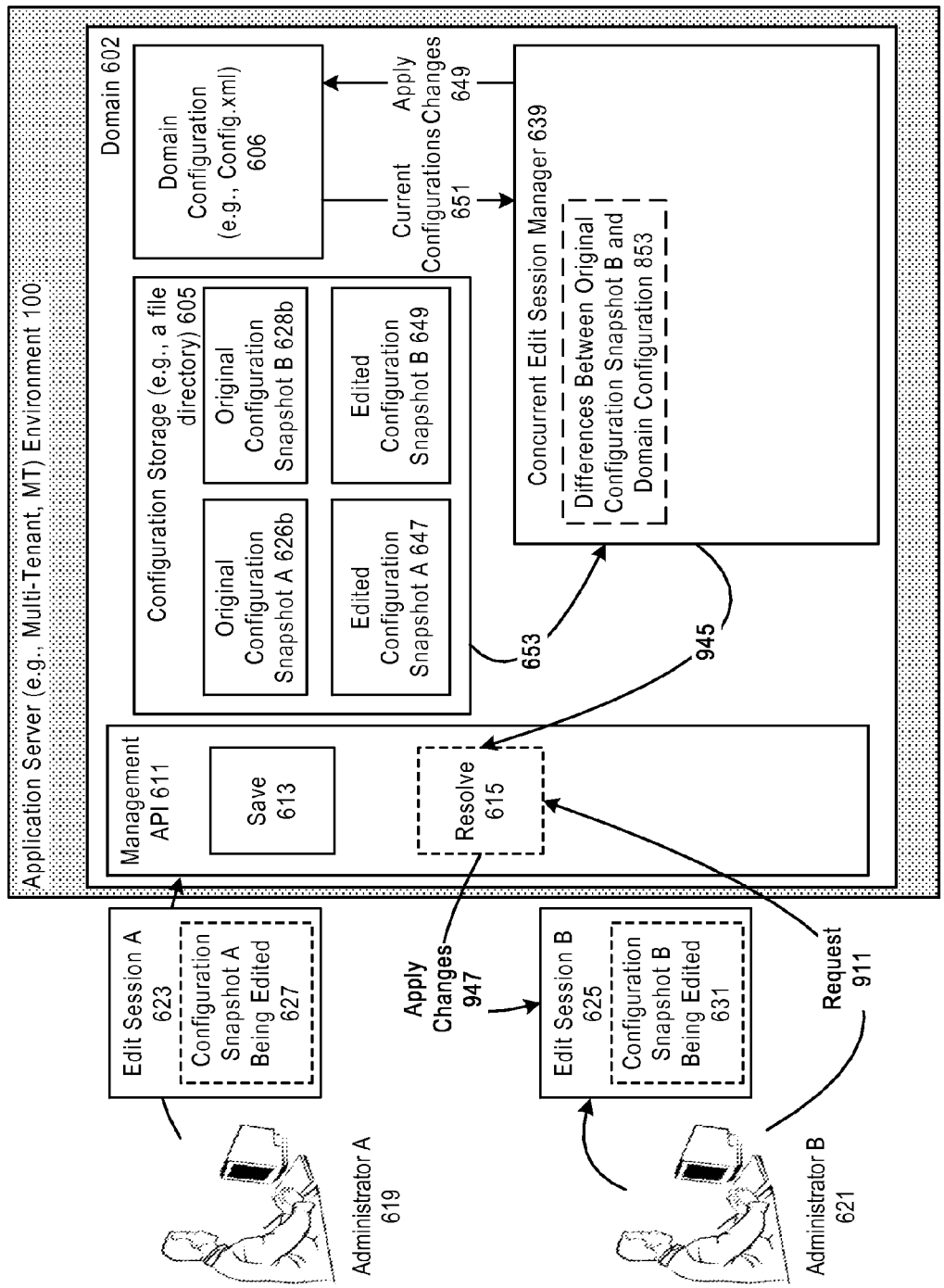
FIG. 9 further illustrates a system for supporting multiple edit sessions in an application server, cloud or other environment, in accordance with an embodiment.

FIG. 9 further illustrates a system for supporting multiple edit sessions in an application server, cloud or other environment, in accordance with an embodiment.

In accordance with an embodiment, when conflicts are identified by the concurrent session manager, the resolve method in the management API can be invoked at the request 911 of the administrator B, to resolve these conflicts.

In accordance with an embodiment, the resolve method can be executed with a parameter (for example, stopOnConflict=false), to apply 947 any changes that have been concurrently applied to the domain configuration to the edit session B, if those changes are not in conflict with changes made in the edit session B.

For example, the changes 945 can be the differences between the original configuration snapshot B and the domain configuration.

In accordance with an embodiment, the following rules can be used to apply the changes to the edit session, where EDIT represents the edit session, CURRENT represents the domain configuration, and where a bean can be a configuration bean in the domain.

1) EDIT has updated a bean that has been deleted in CURRENT. Updates to a bean include changing an attribute or adding a child bean.
   RESOLVE METHOD: Bean can be deleted in EDIT.
2) EDIT deleted a bean that has been changed in CURRENT.
   RESOLVE METHOD: Bean will stay deleted in EDIT.
3) EDIT changed an attribute that has also been changed in CURRENT. This includes simple datatype attributes and array of simple datatype attributes. In addition, there are arrays of MBeans in which the order is sensitive.
   RESOLVE METHOD: Value from EDIT can stay unchanged.
4) EDIT add new bean which has same qualified key as added bean in CURRENT. It is detected as different conflict then attribute change conflict because it better fits used conflict detection and resolve method which as much as possible use existing diff and merge tools in WLS.
   RESOLVE METHOD: Bean will be unchanged in EDIT.
5) EDIT set reference (as a value of some property) pointing to bean which was removed in CURRENT.
   RESOLVE METHOD: Reference is un-set
6) CURRENT set reference (as a value of some property) pointing to bean which was removed in EDIT.
   RESOLVE METHOD: EDIT will not be changed, i.e. bean will stay deleted.
7) EDIT add a bean which contains reference (as a value of some property) pointing to bean which was removed in CURRENT
   RESOLVE METHOD: Reference in added bean will be unset
8) CURRENT add a bean which contains reference (as a value of some property) pointing to bean which was removed in EDIT.
   RESOLVE METHOD: New bean will be add also to EDIT and reference will be unset.

Listing 2

As illustrated in Listing 2, a list of recognized configuration conflicts, and a resolve method for each conflict are identified.

In accordance with an embodiment, after the resolve method has been called, the administrator can again proceed with activation of pending changes in the edit session. The resolve operation can ensure that there are be no more conflicts as long as another edit session has not activated any new changes in the meantime.

In accordance with an embodiment, the resolve process can lead to inconsistent configuration which are not accepted in a configuration validation phase. The administrator can modify a resolved session to a consistent, valid and meaningful state using information displayed on a user interface. The displayed information can include conflicts, wherein each conflict can contain a description of the conflict, for example, identification of beans/properties in the conflict; and one or more messages that describes what has been resolved of that conflict.

Additional information that can be used by the administrator includes log messages, which can contain a short description of each resolve and merge step. The log messages can be used to identify which changes have been made, and how the changes have been made in a particular edit session.

In accordance with an embodiment, the above-described information can be accessible from the resolve task on a user interface, or printed on a scripting tool (for example, WebLogic Scripting Tool) when the resolve method is called.

Figure 10:
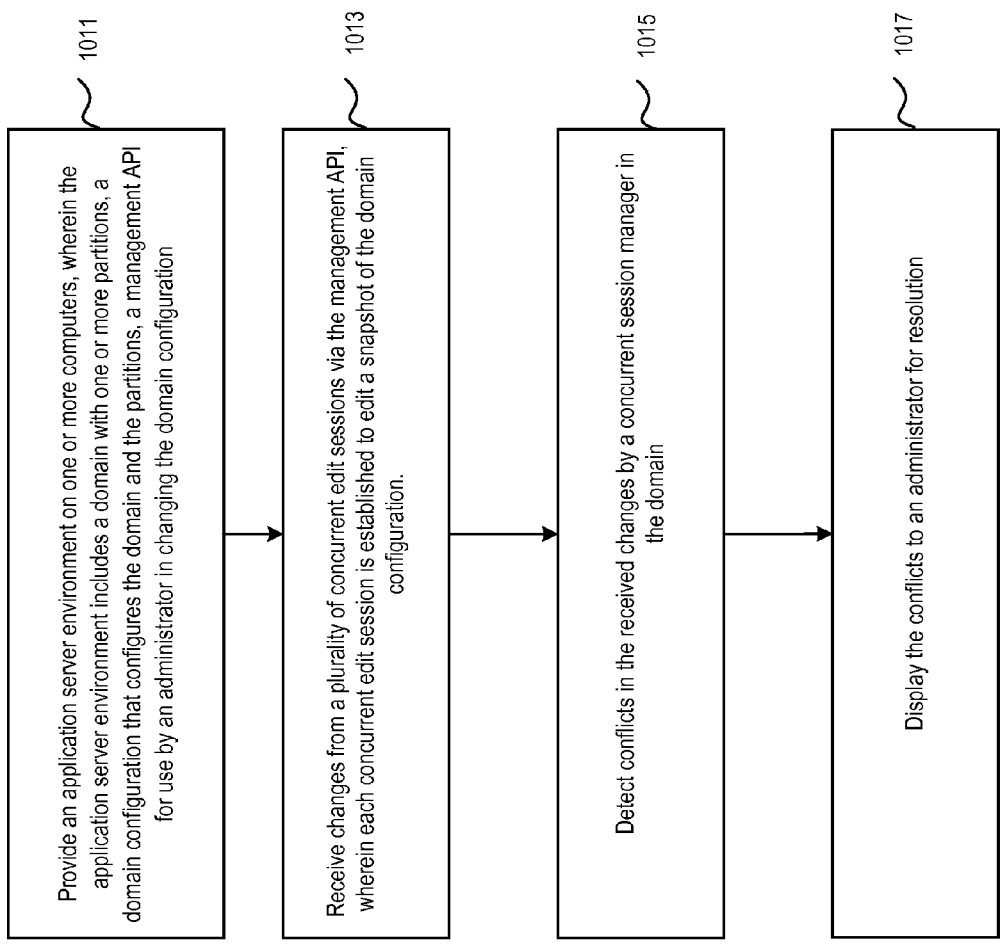
FIG. 10 illustrates a method for supporting multiple edit sessions in an application server, cloud or other environment, in accordance with an embodiment.

FIG. 10 further illustrates a system for supporting multiple edit sessions in an application server, cloud or other environment, in accordance with an embodiment.

As shown in FIG. 10, at step 1011, an application server (for example, multi-tenant) environment, can be provided on one or more computers, wherein the application server environment includes a domain with one or more partitions, a domain configuration that configures the domain and the partitions, a management API for use by an administrator in changing the domain configuration.

At step 1013, changes from a plurality of concurrent edit sessions are received via the management API, wherein each concurrent edit session is established to edit a snapshot of the domain configuration.

At step 1015, conflicts in the received changes can be detected by a concurrent session manager in the domain.

At step 1017, the conflicts can be displayed to an administrator for resolution.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting multiple edit sessions in a multitenant application server environment, comprising:
   one or more computers, each computer including a microprocessor and a memory;
   a multitenant application server environment on the computers, wherein the multitenant application server environment includes
   a domain of a plurality of application server instances,
   a domain configuration that configures the domain into one or more partitions, wherein each partition represents a runtime for use by a tenant of the multitenant application server environment,
   a management API that includes a plurality of methods for use in changing the domain configuration, and
   a concurrent session manager in the domain;
   a first edit session configured to edit a first snapshot using the management API, and a second edit session configured to edit a second snapshot using the management API;
   wherein each of the first snapshot and the second snapshot is created from the domain configuration;
   wherein the second edit session is started before changes made to the first snapshot are merged into the domain configuration;
   wherein the concurrent session manager operates to
   merge changes made to the first snapshot into the domain configuration,
   receive a request for merging changes made to the second snapshot into the domain configuration,
   compare the second snapshot with the domain configuration which includes the changes made to the first snapshot,
   detect conflicts between the second snapshot and the domain configuration, and
   display an alert of the detected conflicts.

2. The system of claim 1, wherein the concurrent session manager detects the conflicts by perform the steps of:
   determining a first difference between the domain configuration and changes made by an administrator to a snapshot of the domain configuration;
   determining a second difference between the snapshot of the domain configuration and the domain configuration; and
   comparing the first and second differences.

3. The system of claim 1, wherein each of the first edit session and the second edit session is started by a different system administrator.

4. The system of claim 1, wherein each of the first edit session and the second edit session is started by a different partition administrator.

5. The system of claim 1, where the first edit session and the second edit session are started by a system administrator and a partition administrator.

6. The system of claim 1, wherein the concurrent session manager is invoked when an administrator performs an activate action using the management API to merge changes made by the administrator to the domain configuration.

7. The system of claim 6, wherein the administrator performs a resolve action using the management API after viewing the displayed conflicts, and performs an activate action using the management API.

8. The system of claim 6, wherein the changes made by the administrator are merged into the domain configuration if no conflicts are detected.

9. The system of claim 1, wherein each snapshot is persisted to a storage for use in detecting the conflicts by the concurrent session manager.

10. The system of claim 9, wherein the persisting of the snapshot occurs when an administrator associated with the snapshot performs an activate action.

11. A method for supporting multiple partitions and edit sessions in a multitenant application server environment, comprising:
    providing an multitenant application server environment on one or more computers, wherein the multitenant application server environment includes
    a domain configuration that configures the domain into one or more partitions, wherein each partition represents a runtime for use by a tenant of the multitenant application server environment,
    a management API for use in changing the domain configuration, and
    a concurrent session manager in the domain;
    starting a first edit session and a second edit session, wherein the first edit session is configured to edit a first snapshot of the domain configuration using management API, wherein the second edit session is configured to edit a second snapshot of the domain configuration using management API, and wherein the second edit session is started before changes made in the first edit session are merged into the domain configuration;

merging, by the concurrent session manager, changes made to the first snapshot into the domain configuration;

receiving a request for merging changes made to the second snapshot into the domain configuration;

comparing, by the concurrent session manager, the second snapshot with the domain configuration which includes the changes made to the first snapshot;

detecting, by the concurrent session manager, conflicts between the second snapshot and the domain configuration; and displaying an alert of the detected conflicts.

12. The method of claim 11, wherein the concurrent session manager detects the conflicts by perform the steps of:

determining a first difference between the domain configuration and changes made by an administrator to a snapshot of the domain configuration;

determining a second difference between the snapshot of the domain configuration and the domain configuration; and comparing the first and second differences.

13. The method of claim 12, wherein the administrator is selected from the group consisting of a system administrator, and a partition administrator.

14. The method of claim 11, wherein each of the first edit session and the second edit session is started by a different partition administrator, or by a different system administrator.

15. The method of claim 11, where the first edit session and the second edit session are started by a system administrator and a partition administrator.

16. The method of claim 11, wherein the concurrent session manager is invoked when an administrator performs an activate action using the management API to merge changes made by the administrator to the domain configuration.

17. The method of claim 16, wherein the administrator performs a resolve action using the management API after viewing the displayed conflicts, and performs an activate action again using the management API.

18. The method of claim 16, wherein the changes made by the administrator is merged into the domain configuration if no conflicts are detected.

19. The method of claim 12, wherein each snapshot is persisted to a storage for use in detecting the conflicts by the concurrent session manager.

20. A non-transitory computer readable storage medium, including instructions stored thereon which when read and executed by one or more computers cause the one or more computers to perform the steps comprising:

providing an multitenant application server environment on one or more computers, wherein the multitenant application server environment includes a domain configuration that configures the domain into one or more partitions, wherein each partition represents a runtime for use by a tenant of the multitenant application server environment, a management API for use in changing the domain configuration, and a concurrent session manager in the domain;

starting a first edit session and a second edit session, wherein the first edit session is configured to edit a first snapshot of the domain configuration using management API, wherein the second edit session is configured to edit a second snapshot of the domain configuration using management API, and wherein the second edit session is started before changes made in the first edit session are merged into the domain configuration;

merging, by the concurrent session manager, changes made to the first snapshot into the domain configuration;

receiving a request for merging changes made to the second snapshot into the domain configuration;

comparing, by the concurrent session manager, the second snapshot with the domain configuration which includes the changes made to the first snapshot;

detecting, by the concurrent session manager, conflicts between the second snapshot and the domain configuration; and displaying an alert of the detected conflicts.

* * * * *

UNITED STATES PATENT AND TRADEMARK OFFICE
CERTIFICATE OF CORRECTION

PATENT NO. : 10,009,225 B2
APPLICATION NO. : 14/747675
DATED : June 26, 2018
INVENTOR(S) : Mares et al.

Page 1 of 1

It is certified that error appears in the above-identified patent and that said Letters Patent is hereby corrected as shown below:

In the Specification

In Column 12, Line 8, after "un-set" insert -- . --.

In Column 12, Line 16, after "CURRENT" insert -- . --.

In Column 12, Line 18, after "unset" insert -- . --.

Signed and Sealed this
Ninth Day of April, 2019

Andrei Iancu
*Director of the United States Patent and Trademark Office*